(12) United States Patent
Callan et al.

(10) Patent No.: US 10,601,597 B2
(45) Date of Patent: *Mar. 24, 2020

(54) BLOCKCHAIN BASED DIGITAL CERTIFICATE PROVISIONING OF INTERNET OF THINGS DEVICES

(71) Applicants: Jonathan Sean Callan, Cambridge (GB); Keir Finlow-Bates, Kangasala (FI)

(72) Inventors: Jonathan Sean Callan, Cambridge (GB); Keir Finlow-Bates, Kangasala (FI)

(*) Notice: Subject to any disclaimer, the term of this patent is extended or adjusted under 35 U.S.C. 154(b) by 0 days.

This patent is subject to a terminal disclaimer.

(21) Appl. No.: 16/297,587

(22) Filed: Mar. 9, 2019

(65) Prior Publication Data

US 2020/0007346 A1     Jan. 2, 2020

Related U.S. Application Data

(63) Continuation of application No. 16/022,278, filed on Jun. 28, 2018, now Pat. No. 10,243,748.

(51) Int. Cl.
*H04L 29/06* (2006.01)
*H04L 9/32* (2006.01)
*H04L 9/06* (2006.01)

(52) U.S. Cl.
CPC .......... *H04L 9/3263* (2013.01); *H04L 9/0643* (2013.01); *H04L 9/3239* (2013.01); *H04L 9/3247* (2013.01); *H04L 9/3265* (2013.01); *H04L 2209/38* (2013.01)

(58) Field of Classification Search
CPC .... H04L 9/3263; H04L 9/3247; H04L 9/0643
See application file for complete search history.

(56) References Cited

U.S. PATENT DOCUMENTS

| | | | | |
|---|---|---|---|---|
| 2017/0206522 A1* | 7/2017 | Schiatti | ................... | G06Q 30/00 |
| 2017/0346693 A1* | 11/2017 | Dix | ........................ | H04L 9/3247 |
| 2018/0115425 A1* | 4/2018 | Dechu | .................... | H04L 9/3239 |
| 2018/0121923 A1* | 5/2018 | Uhr | ........................ | G06Q 20/40 |
| 2018/0157825 A1* | 6/2018 | Eksten | .................... | G06F 21/64 |
| 2018/0227116 A1* | 8/2018 | Chapman | .............. | H04L 9/0637 |
| 2018/0241551 A1* | 8/2018 | Fujimura | ................ | G06F 21/10 |
| 2019/0005470 A1* | 1/2019 | Uhr | ........................ | H04L 9/3265 |

* cited by examiner

Primary Examiner — Chau Le

(57) ABSTRACT

A system and method for provisioning an IoT device with a digital certificate without a need for a central Certificate Authority is presented. A blockchain is initiated, with a root certificate presented in an initial block of the blockchain. Said root certificate is subsequently used to sign an authorized certificate. The IoT device is preloaded with a nonce, and a hash of the nonce signed by an authorized certificate is published on the blockchain. The nonce may then be submitted to the blockchain with a self-signed certificate, the presence of the nonce validating the self-signed certificate. The blockchain provides a final single view of a true state of the digital certificates in the system and their respective authority and validity.

18 Claims, 11 Drawing Sheets

| |
|---|
| 700 Certificate validation message header |
| 702 Certificate to validate |
| 704 Version number<br>706 Serial number<br>708 Signature algorithm<br>710 Subject's name<br>712 Subject's public key |
| 714 Associated nonce |
| 716 Calculated hash of nonce |
| 718 Announced hash of nonce |
| 720 Location of announced hash of nonce |
| 722 Hash function used for calculation |
| 724 Location of validation authority certificate |
| 726 Time stamp |
| 728 Hash of preceeding message data |
| 730 Signature using private key of validation authority |

FIG. 7

1000 Smart contract

1002 Procedure: sign hash of nonce and publish

1004 Procedure: publish nonce and certificate on blockchain

1006 Procedure: check certificate validity

1008 Procedure: sign certificate and publish

1010 Procedure: request certificate revocation

1012 Procedure: revoke certificate

FIG. 10

BLOCKCHAIN BASED DIGITAL CERTIFICATE PROVISIONING OF INTERNET OF THINGS DEVICES

The present application is a continuation of, and claims priority of, U.S. non-provisional application Ser. No. 16/022,278, entitled "Blockchain Based Digital Certificate Provisioning Of Internet Of Things Devices", filed Jun. 28, 2018. The aforementioned United States application is hereby incorporated by reference in its entirety.

TECHNICAL FIELD

This disclosure relates to computer systems and methods concerned with the provisioning of Internet of Things (IoT) devices with digital certificates, and more specifically to a distributed and decentralized method for provisioning digital certificates using a blockchain.

BACKGROUND

Distributed ledgers or blockchains provided in, for example, a peer-to-peer network, such as the distributed ledger used in the Bitcoin cryptocurrency system, allow participants on the peer-to-peer network to participate in a sharing of data in a distributed manner without a need for a central authority.

A public key infrastructure (PKI) may rely on digital certificates in order to identify parties operating in a system, and to enable encrypted secure communication between parties. For example, digital certificates are used to identify web sites, and to enable clients to connect and download web pages over a secure connection, using secure sockets layer (SSL) or transport layer security (TLS) cryptographic protocols.

In order to trust the digital certificates, a root certificate may sign other certificates, providing the other certificates with validity. A PKI thus relies on a trust in the root certificate.

In a centralized system an issue of establishing the trust is overcome by faith in a central authority, which owns the root certificate. The policies and processes a provider uses to decide which certificate authorities their software should trust are called root programs.

A centralized system operator may also be responsible for a distribution of valid certificates, and for maintaining a public register of certificates issued and revoked.

However, centralized systems and centralized root programs have a number of problems. The central authority may have the ability to arbitrarily issue and revoke certificates. Furthermore, central authorities usually charge for their services, resulting in higher costs for users of the system.

Furthermore, IoT devices may comprise lightweight devices in terms of memory and power consumption, with limitations on network connectivity. A current solution is to generate certificates for each IoT device in a chip factory and pre-load the certificate onto an IoT device. As time and effort are at a premium in the chip factory, an improvement to the current solution by reducing an amount of data to load onto the IoT device, and a number of computations that may be performed to generate the certificate may be desirable.

It is therefore the intention of the present disclosure to address the problem of enabling a public key infrastructure and certificate distribution to IoT devices in a decentralized fashion without recourse to a central authority, and without having to pre-load IoT devices with certificates or require extensive computations.

SUMMARY

In accordance with the present disclosure, example embodiments are described for distributing valid certificates to IoT devices through a medium of a blockchain.

An example embodiment may include a method comprising one or more of: loading a nonce onto a device, publishing a hash of the nonce signed by an authorized digital certificate on a blockchain, and publishing a message comprising the digital certificate and the nonce on the blockchain.

In the example embodiment, the digital certificate may be rejected as invalid if the blockchain does not comprise the message.

In the example embodiment, the authorized certificate may comprise a root certificate, or a certificate authorized through a chain of signatures referring back to the root certificate. In an alternate example embodiment, the authorized certificate may be designated as authorized by signing the hash of the nonce.

In the example embodiment, a plurality of nonces may be loaded onto the device, and correspondingly a plurality of hashes of the plurality of nonces may be published on the blockchain. Each one of the plurality of hashes of the plurality of nonces may be signed by a one of a plurality of digital certificates. In some embodiments each of the one of the plurality of digital certificates may comprise a same authorized digital certificate. In other embodiments each one of the plurality of digital certificates may comprise a different authorized digital certificate.

In the example embodiment, the device may comprise an Internet of Things (IoT) compatible device. The message may be submitted to the blockchain by the device.

In the example embodiment, after the message has been detected on the blockchain, a second message comprising a signature of the digital certificate, said signature generated using the authorized digital certificate, may be published on the blockchain.

In the example embodiment, one or more of: the digital certificate, the hash of the nonce, the message, the authorized digital certificate, the signature, and the second message, may be stored in and processed by a smart contract running on the blockchain.

An other example embodiment may include an apparatus for provisioning a device with a digital certificate, comprising a processor configured to load a nonce onto the device, and publish a hash of the nonce signed by an authorized digital certificate on a blockchain. The device may publish a message comprising the digital certificate and the nonce on the blockchain. In further embodiments, the device may generate the nonce and publish the hash of the nonce on the blockchain.

In the other example embodiment, the processor may be further configured to reject a validity of the digital certificate if the blockchain does not comprise the message.

In the other example embodiment, the processor may be further configured to load a plurality of nonces onto the device, and publish a plurality of hashes of the plurality of nonces, signed by a one or more authorized digital certificates, on the blockchain. Each one of the plurality of hashes of the plurality of nonces may be signed by a one of a plurality of digital certificates. In some embodiments each of the one of the plurality of digital certificates may comprise a same authorized digital certificate. In other embodiments each one of the plurality of digital certificates may comprise a different authorized digital certificate.

In the other example embodiment, the device may comprise an Internet of Things (IoT) compatible device.

In the other example embodiment the device may be further configured to publish the message on the blockchain via an intermediary. The intermediary may comprise a blockchain node, a Constrained Application Protocol (CoAP) server, a Message Queuing Telemetry Transport (MQTT) server, or an other server configured to accept connections from the device and forward them on to the blockchain.

In the other example embodiment, the processor may be further configured to publish a second message on the blockchain, comprising a signature of the digital certificate generated using the authorized digital certificate. The processor may publish the second message in response to detecting the message comprising the digital certificate and the nonce on the blockchain.

In the other example embodiment, the processor may be configured to: detect the message on the blockchain, verify that a calculated hash of the nonce in the message matches the hash of the nonce published on the blockchain and signed by the authorized digital certificate, and subsequently publish the second message.

In the other example embodiment, a smart contract may be submitted to the blockchain, said smart contract comprising code that when executed on one or more processors of one or more nodes maintaining and extending the blockchain, allows a storage and/or a processing of one or more of: the digital certificate, the hash of the nonce, the message, the authorized digital certificate, the signature, the second message.

A yet other example embodiment may include a non-transitory computer readable medium embodying instructions for provisioning a device with a digital certificate, the instructions when executed causing a processor to load a nonce onto the device, and publishing a hash of the nonce signed by an authorized digital certificate on a blockchain. Subsequently the device may publish a message comprising the digital certificate and the nonce on a blockchain.

In the yet other example embodiment, the processor may be configured by the instructions to perform a rejection of a validity of the digital certificate if the blockchain does not comprise the message.

In the yet other example embodiment, the processor may be configured by the instructions to perform a loading of a plurality of nonces onto the device, and publishing a plurality of hashes of the plurality of nonces, signed by a one or more authorized digital certificates. Each one of the plurality of hashes of the plurality of nonces may be signed by a one of a plurality of digital certificates. In some embodiments each of the one of the plurality of digital certificates may comprise a same authorized digital certificate. In other embodiments each one of the plurality of digital certificates may comprise a different authorized digital certificate.

In the yet other example embodiment, the device may comprise an Internet of Things (IoT) compatible device.

In the yet other example embodiment the device may be further configured to publish the message on the blockchain via an intermediary. The intermediary may comprise a blockchain node, a Constrained Application Protocol (CoAP) server, a Message Queuing Telemetry Transport (MQTT) server, or an other server configured to accept connections from the device and forward them on to the blockchain.

In the yet other example embodiment, the processor may be further configured by the instructions to perform a publishing of a second message on the blockchain, comprising a signature of the digital certificate generated using the authorized digital certificate. The processor may perform the publishing of the second message in response to detecting the message comprising the digital certificate and the nonce on the blockchain.

In the yet other example embodiment, the processor may be configured by the instructions to perform one or more of the following: detecting the message on the blockchain, verifying that a calculated hash of the nonce in the message matches the hash of the nonce published on the blockchain and signed by the authorized digital certificate, subsequently publishing the second message.

In the yet other example embodiment, a smart contract may be submitted to the blockchain, for example by the processor or by an other party, said smart contract comprising code that when executed on a one or more processors of one or more nodes maintaining and extending the blockchain, allows a storage and/or a processing of one or more of: the digital certificate, the hash of the nonce, the message, the authorized digital certificate, the signature, the second message.

In embodiments of the present disclosure, digital certificates may comprise a public key, and none or more of: a private key, a subject, an email address, a serial number, a thumb-print record, an other biometric record, an expiry date, a signature by an authorized digital certificate, a signature by a root certificate, a usage descriptor, a common name, a web site identifier, a device identifier, an organization name, an organizational unit, an issue date, a hash of a some or all of a remainder of a certificate data.

In other embodiments of the present disclosure, digital certificates may comprise an X.509 standard certificate, an OpenPGP certificate, a card verifiable certificate (CVC), or an other standard certificate format.

In some embodiments of the present disclosure, provisioning a digital certificate may comprise generating, signing and providing the digital certificate to a device. In yet other embodiments of the present disclosure, provisioning a digital certificate may comprise methods and systems whereby the device generates the digital certificate, and a provenance of the digital certificate is confirmed and subsequently recorded, for example through appending a signature to the digital certificate and publishing the digital certificate and the signature on a blockchain.

In some embodiments of the present disclosure, a nonce may comprise a random number. In other embodiments the nonce may comprise an arbitrary number, used only once per device, to be used as as an initialization vector in a process of provisioning the device with a digital certificate. In yet other embodiments of the present disclosure, the nonce may be required to be non-repeating and unique.

In some embodiments of the present disclosure, a certificate signing request may be published on the blockchain by the device or by an intermediary. The certificate signing request may comprise the nonce and a presented digital certificate. A certificate authority may subsequently sign the presented digital certificate and publish one or more of the presented digital certificate and a signature on the blockchain.

Those skilled in the art will further appreciate the advantages and superior features found in this disclosure together with other important aspects thereof on reading the detailed description that follows in conjunction with the drawings.

BRIEF DESCRIPTION OF THE DRAWINGS

The components in the figures are not necessarily to scale, emphasis instead being placed upon illustrating the principles of the present disclosure. In the figures, like reference numerals designate corresponding parts throughout the different views.

FIG. 7 illustrates a structure for a message, published on a blockchain, said message verifying an announcement of a digital certificate and publishing a signature for the digital certificate.

FIG. 10 is a programmatic diagram illustrating a structure of a smart contract providing functions and methods related to digital certificate provisioning.

DETAILED DESCRIPTION

Various aspects of this disclosure are now described with reference to the drawings. In a description that follows, specific details are provided to promote a thorough understanding of one or more aspects of the disclosure.

The present disclosure is directed to a method, apparatus, and system for provisioning a device with a digital certificate using blockchain technology.

Figure 1:
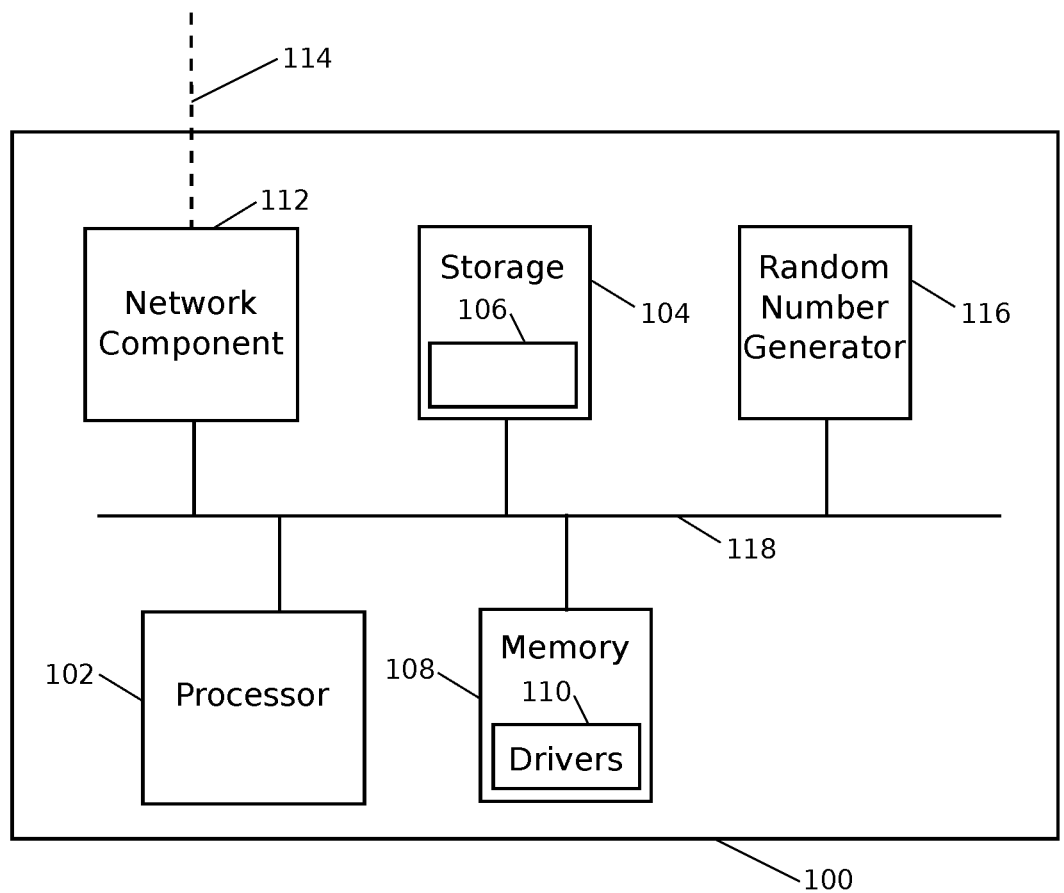
FIG. 1 illustrates an apparatus configured to support one or more of the example embodiments.

In FIG. 1, an embodiment of an apparatus 100 supporting a provisioning of a digital certificate is presented.

In the embodiment, the apparatus 100 may comprise a processor 102, comprising one or more central processing units (CPUs), capable of executing instructions stored in a memory 108, and controlling other peripheral components through drivers 110 stored within the memory.

Further storage 104 may be present, which may comprise a cryptographically secure partition 106 or other component where cryptographic keys may be securely stored. Instructions may be retrieved from the storage 104 and transferred to the memory 108 as required.

The storage 104 may comprise a non-transitory computer readable medium storing instructions that may be executed by the processor 102.

The apparatus 100 may comprise a network component 112, which may connect the apparatus 100 to a network. The network component 112 may consist of a direct wired connection to a packet switched network through a cable 114. In other embodiments a connection to the network may be through wireless components comprising one or more wireless modules implemented in firmware or hardware, for example, a wireless local area network (WLAN) unit such as a WiFi adapter utilizing an 802.11 protocol, a wireless wide area network (WWAN) unit such as Global System for Mobile communications (GSM), Long Term Evolution (LTE), or other cellular wireless data communication system.

The apparatus 100 may comprise a random number generator 116. In some embodiments the random number generator 116 may comprise a module to execute a pseudo-random number generating algorithm. In other embodiments the random number generator 116 may comprise a hardware random number generator, and may use a source of random information, such as a thermal noise generator, a nuclear decay radiation source, a photon transmitter and receiver, a homodyne detector, a spontaneous parametric down-conversion detector.

Components comprising the apparatus 100 may communicate through a bus 118, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Figure 2:
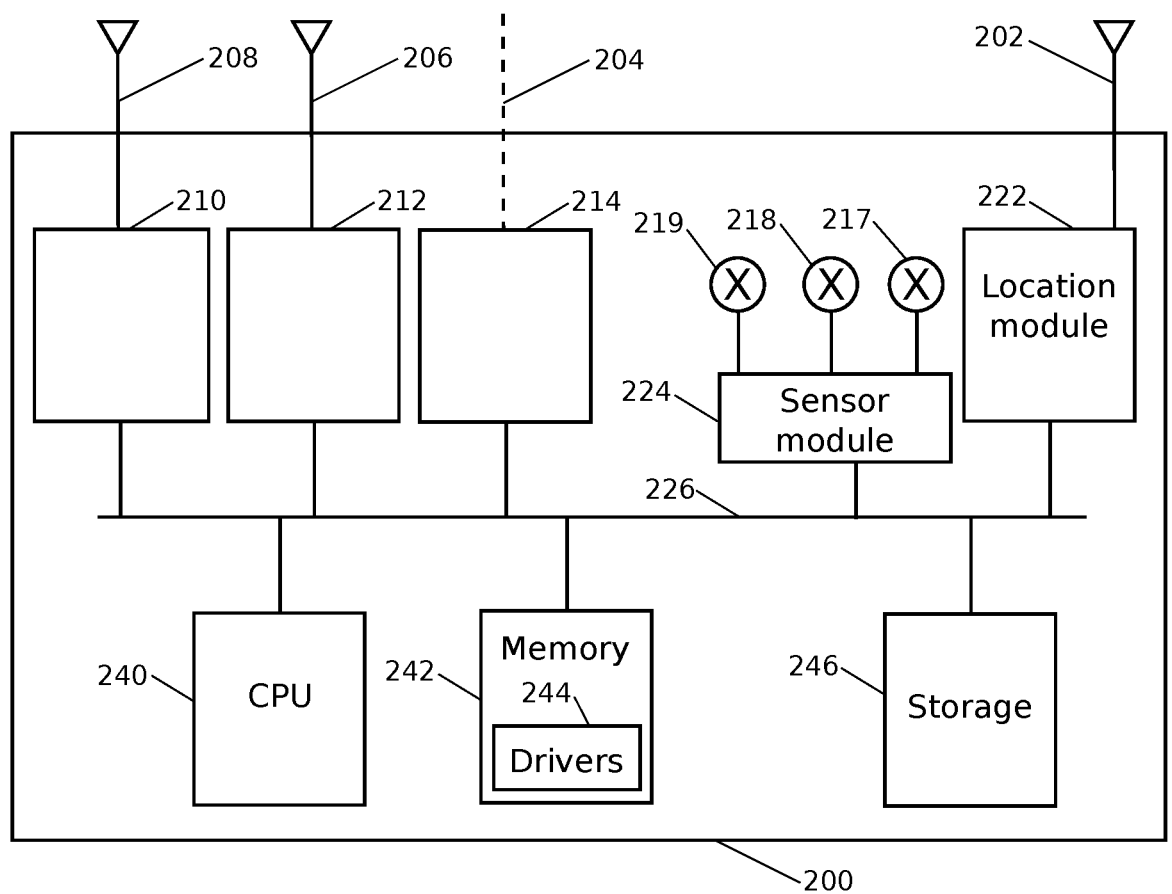
FIG. 2 illustrates a device to be provisioned with a digital certificate.

An embodiment of a device 200 to be provisioned with a digital certificate is presented in FIG. 2, and is now discussed in further detail. The device 200 may comprise a one or more central processing units (CPU) 240 capable of executing instructions stored in a memory 242, and controlling other peripheral components through drivers 244 stored within the memory 242.

Further storage 246 may be present, which may comprise a cryptographically secure partition or component where cryptographic keys may be securely stored.

The device 200 may comprise a network module 214, which may consist of a direct wired connection to a packet switched network through a cable 204.

The device 200 may comprise a wireless network module 212, which may comprise wireless components comprising one or more wireless modules implemented in firmware or hardware, including a wireless local area network (WLAN) unit such as a Wi-Fi adapter utilizing an 802.11 protocol, a wireless wide area network (WWAN) unit such as Global System for Mobile communications (GSM), Long Term Evolution (LTE), or other cellular wireless data communication system. The wireless network module may comprise an antenna 206. The wireless components may provide network connectivity to a packet switched network for the device 200.

The device 200 may comprise a Bluetooth network module 210, which may comprise wireless components comprising one or more Bluetooth modules implemented in firmware or hardware. The Bluetooth network module 210 may comprise an antenna 208. The Bluetooth components may provide network connectivity to a packet switched network for the device 200.

Components comprising the device 200 may communicate through a bus 226, which may be implemented as a peripheral component interconnect express (PCIe) bus, a universal serial bus (USB), a universal asynchronous receiver/transmitter (UART) serial bus, a suitable advanced micro-controller bus architecture (AMBA) interface, a serial digital input output (SDIO) bus, or other equivalent interface.

Optionally, the device 200 may also comprise an integrated location determining module 222, comprising one or more of: a global navigation satellite system (GNSS) receiver, a real-time kinematic (RTK) module, a magnetic navigation module, and an antenna 202 for said GNSS receiver or RTK module.

Optionally, the device 200 may also comprise a sensor module 224, connected to one or more sensors or MEMS devices 217, 218, 219. Such sensors may comprise one or more of: an altimeter, a magnetometer, a gyroscopic sensor, an accelerometer, a thermometer, a pressure gauge, a light sensor, a camera, a microphone, an odometer, an infrared sensor, an ultrasonic sensor, a gas sensor, a smoke sensor, an alcohol sensor, a proximity sensor, a humidity sensor, a moisture sensor, a tilt sensor, a force sensor, an electrical resistance meter, a voltage meter, an electrical current meter, an other sensor type.

Figure 3:
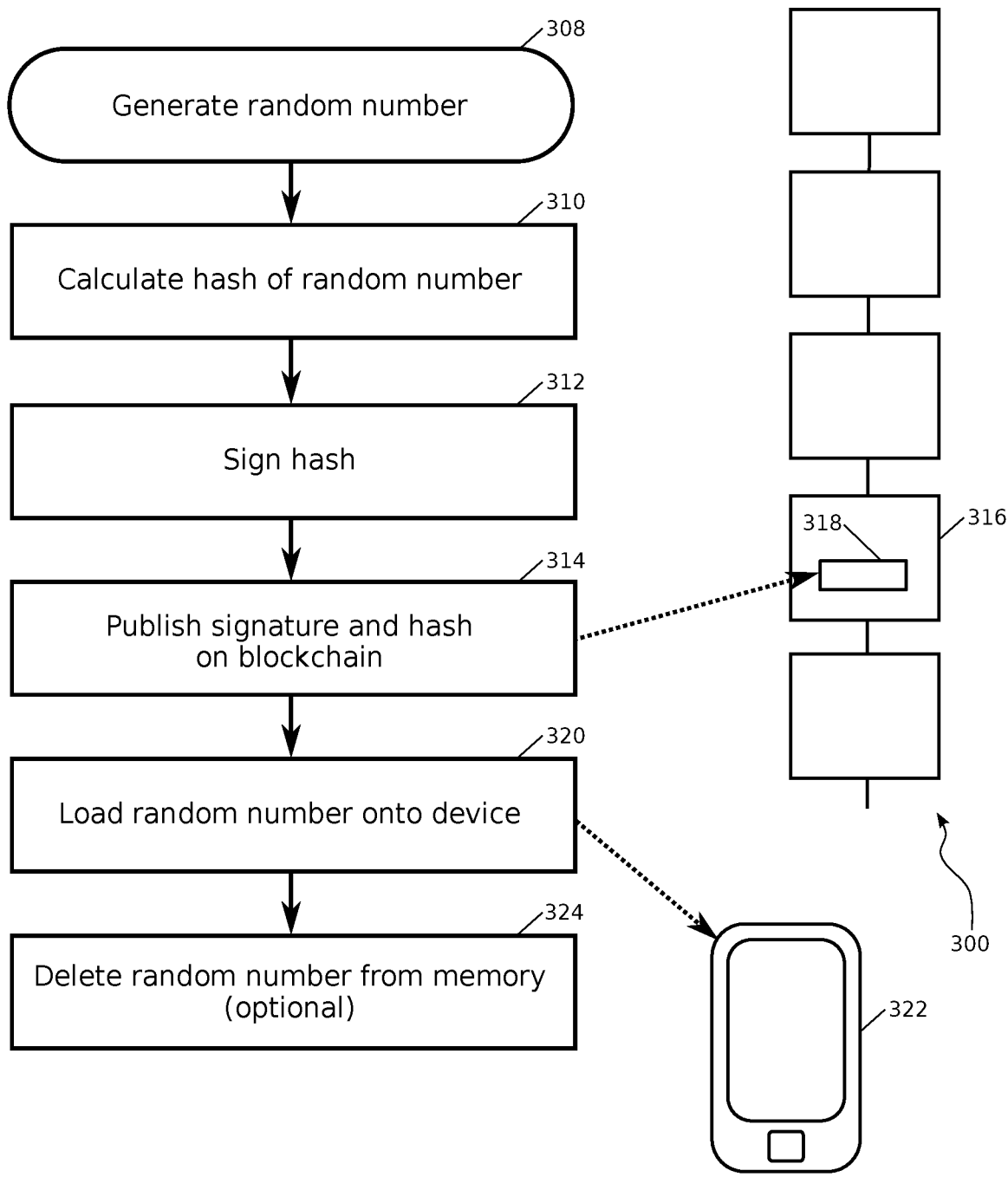
FIG. 3 is a flow diagram illustrating a process for loading a nonce onto a device and publishing a hash of the nonce on a blockchain.

In FIG. 3 a flow diagram illustrating a process for loading a nonce onto a device 322 and publishing a hash of the nonce onto a blockchain 300 is presented, in accordance with an embodiment of the present disclosure.

In some embodiments, actions may commence with a generation of a random number, as illustrated in step 308.

In some embodiments, actions may proceed with a calculation of a hash of the random number, as illustrated in step 310. The hash may be calculated using a cryptographic hash algorithm, for example: SHA, RIPEMD, Whirlpool, Scrypt, HAS-160, BLAKE, or other cryptographic hash function.

In some embodiments, actions may proceed with generating a signature of the hash of the random number, as shown in step 312. The hash may be signed with a digital certificate. A digital signature algorithm used may be one of ECDSA, DSA, RSA, or some other secure asymmetric key digital signing algorithm.

In some embodiments, actions may proceed with publishing the signature and the hash on the blockchain 300 as shown in step 314. The signature and the hash may be submitted to participants on the blockchain 300 as a transaction 318, and the transaction 318 may be included in a block 316 of the blockchain.

In some embodiments, actions may proceed with loading the random number onto the device 322, as shown in step 320. The device 322 may comprise an IoT device. In other embodiments the device 322 may comprise a module, a microchip, a silicon die, a silicon wafer.

In some embodiments, actions may proceed with deleting the random number from a memory of an apparatus performing some or all of an aforementioned steps, as shown in step 324.

Those skilled in the art will appreciate that in the embodiments above, for illustrative purposes, specific examples of described actions are presented. In other examples some of the described actions may be taken in an alternate order, and other actions may be taken.

Figure 4:
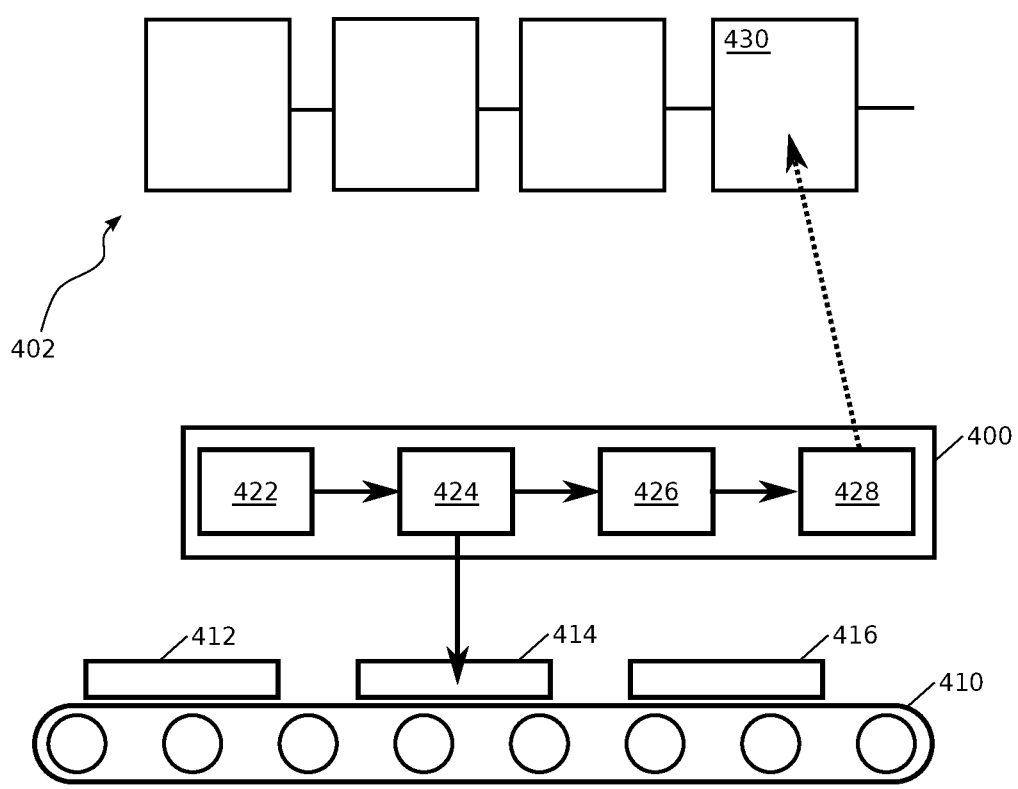
FIG. 4 is an illustration of an apparatus for loading a nonce onto a device, and publishing a hash of the nonce on a blockchain.

In FIG. 4 an embodiment of an apparatus 400 for loading a nonce onto a device, and publishing a hash of the nonce on a blockchain 402, is presented.

In some embodiments, the apparatus 400 may comprise one or more modules, for example: a random number generator 422, a data loading module 424, a hash calculator 426, a blockchain messaging module 428.

In some embodiments, the random number generator 422 may generate a random number, henceforth referred to as a nonce, and pass it to the data loading module 424.

In some embodiments, the data loading module 424 may load the nonce onto a device 414, and if loading the nonce is successful, the data loading module 424 may pass the nonce to the hash calculator 426. In other embodiments the random number generator 422 may pass the nonce to the hash calculator 426.

In some embodiments, the hash calculator 426 may calculate a hash of the nonce, and may then pass the hash to the blockchain messaging module 428.

In some embodiments, the blockchain messaging module 428 may transmit a message comprising the hash to the blockchain 402 for inclusion in a block 430. In other embodiments the message may comprise an authorized digital certificate, and the hash may be signed using the authorized digital certificate.

In some embodiments, a plurality of devices 412, 414, 416, may be presented in turn to the apparatus 400, by a conveyance 410, to be loaded with nonces by the data loading module 424. In an example state of the apparatus 400 and associated systems and devices, the device 416 may be loaded with a nonce, the device 414 may be undergoing loading with a nonce, and the device 412 may be awaiting loading with a nonce.

In some embodiments, each of the devices 412, 414, 416 may comprise an IoT device. In other embodiments the devices 412, 414, 416 may comprise one or more of: a module, a microchip, a silicon die, a silicon wafer, and an other form of device to be loaded with a nonce.

Figure 5:
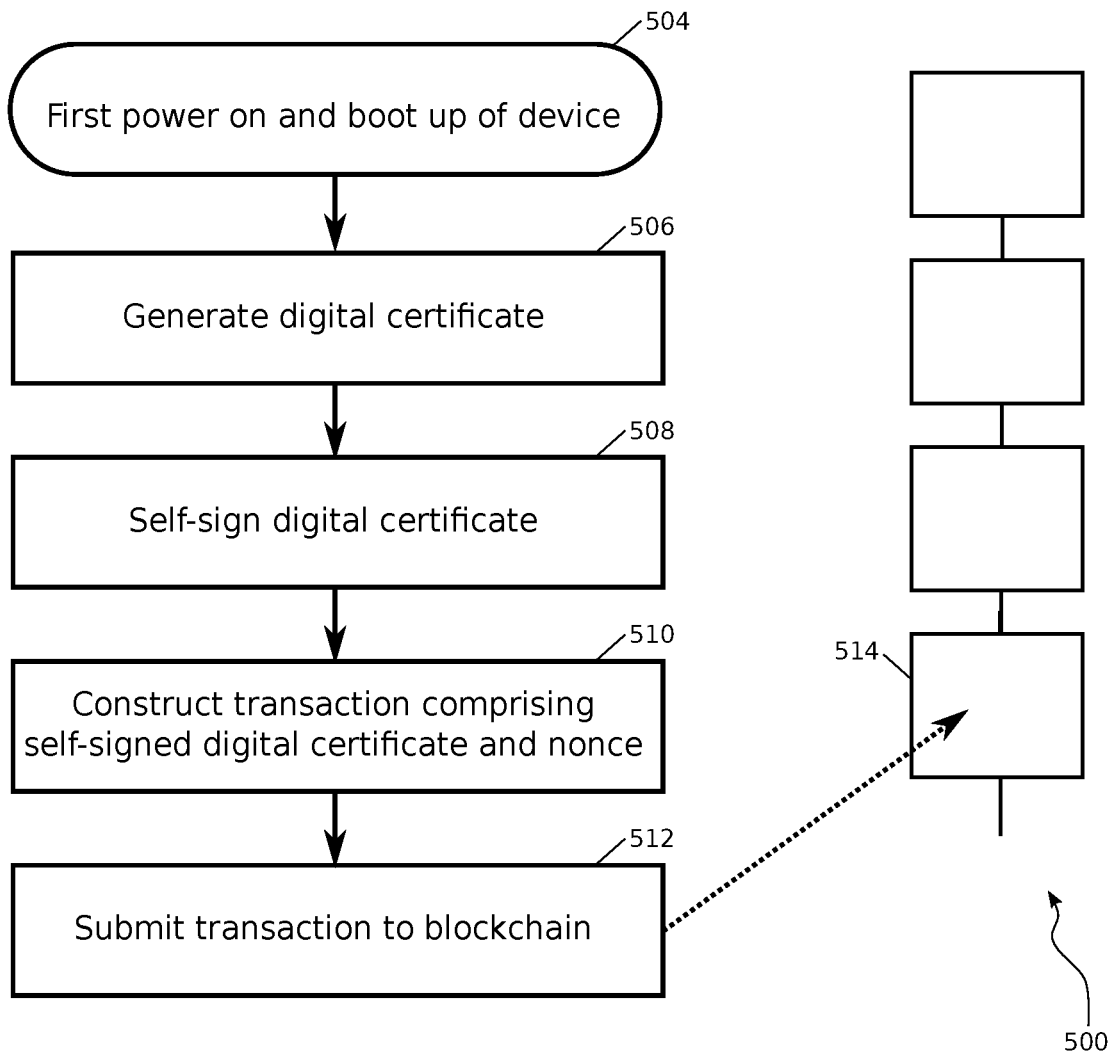
FIG. 5 is a flow diagram illustrating a process for a device to generate a digital certificate and validate said digital certificate on a blockchain.

In FIG. 5 a flow diagram is presented, illustrating a process for a device to generate a digital certificate and validate said digital certificate on a blockchain.

In some embodiments, actions may commence with a device powering on and booting up for a first time, as illustrated in step 504. In other embodiments actions may commence after a plurality of device powering on events or device booting up events. In yet other embodiments, actions of generating a valid digital certificate may commence after a number of other non-related actions. In yet further embodiments, actions of generating a valid digital certificate may commence after the device determines that no digital certificate is present in memory or storage.

In some embodiments, actions may proceed with a generation of a digital certificate, as illustrated in step 506.

In some embodiments, actions may proceed with a self-signing of the digital certificate, as shown in step 508. A digital signature algorithm used may be one of ECDSA, DSA, RSA, or some other secure asymmetric key digital signing algorithm.

In some embodiments, actions may proceed with a construction of a transaction comprising the digital certificate, a self-signature of the digital certificate, and a nonce, as shown in step 510. In an embodiment of the present disclosure, the nonce may be loaded onto the device at a prior time, stored in secure storage or non-transitory memory within the device, and subsequently retrieved from secure storage or non-transitory memory.

In some embodiments, actions may conclude with a submission of the transaction for inclusion in a block 514 of the blockchain 500, as shown in step 512.

Those skilled in the art will appreciate that in the embodiments above, for illustrative purposes, specific examples of described actions are presented. In other examples some of the described actions may be taken in an alternate order, and other actions may be taken.

Figure 6:
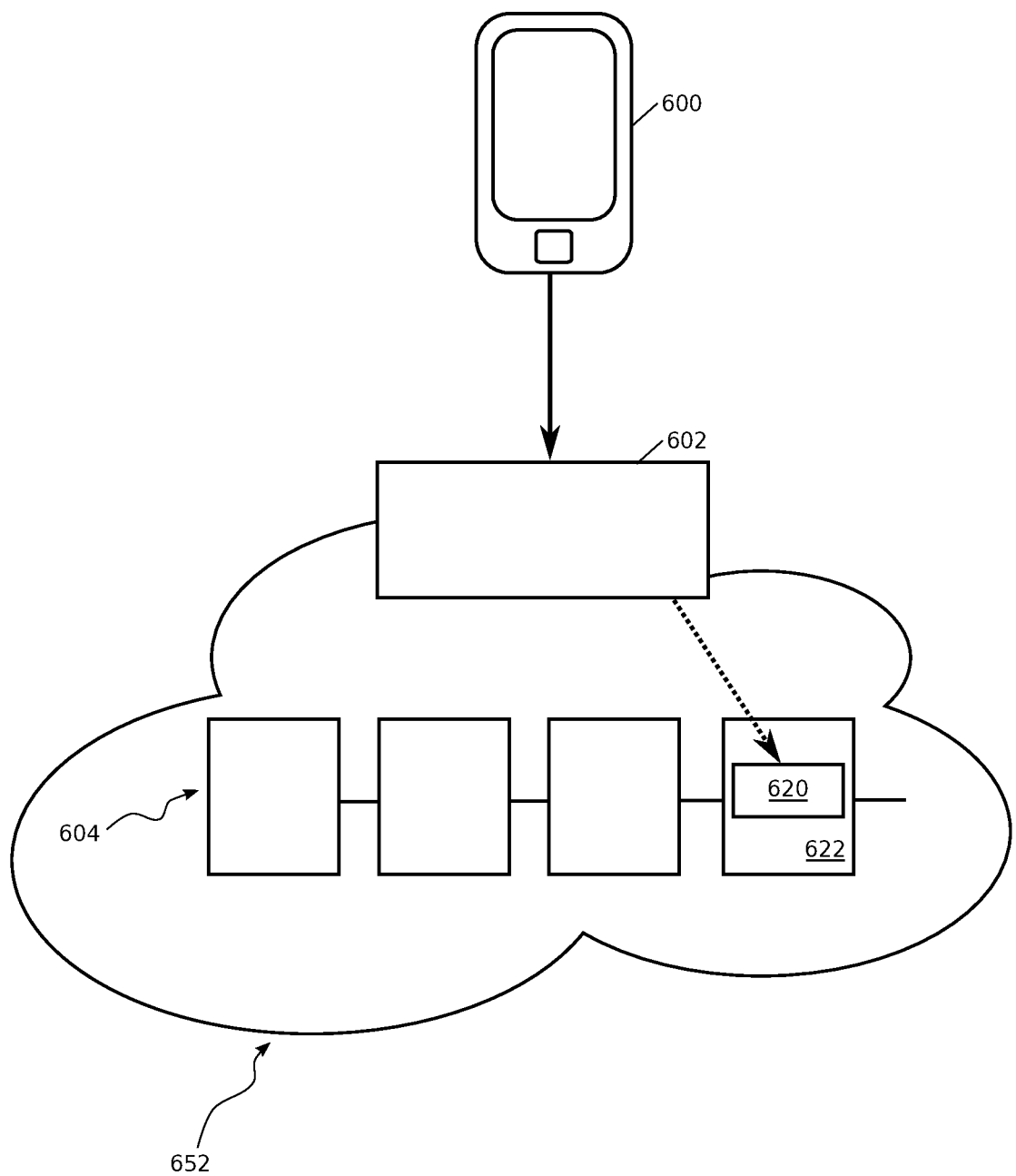
FIG. 6 is a diagram presenting an intermediary publishing an announcement of a digital certificate on behalf of an IoT device.

FIG. 6 is a diagram presenting an intermediary 602 publishing an announcement of a digital certificate on behalf of an IoT device 600, which may have intermittent or limited access to the Internet.

In some embodiments, the intermediary 602 may comprise one or more of: a proxy, a blockchain node, a Constrained Application Protocol (CoAP) server, a Message Queuing Telemetry Transport (MQTT) server, or an other server configured to accept requests or messages from the device and forward them on to the blockchain.

In some embodiments, the IoT device 600 may construct a transaction comprising a pre-loaded nonce and a digital certificate, and may transmit the transaction to the intermediary 602.

In some embodiments, the intermediary 602 may forward the transaction on to a blockchain 604, which in further embodiments may be instantiated in a cloud platform 652.

The transaction may then be included as data 620 in a block 622 included in the blockchain 604.

In some embodiments the intermediary 602 may also comprise a blockchain miner, and may construct the block 622 and append said block 622 to the blockchain 604.

FIG. 7 illustrates a structure for a certificate validation message, published on a blockchain, said certificate validation message verifying an announcement of a digital certificate, and publishing a signature for the digital certificate.

In some embodiments, the certificate validation message may comprise a header 700, which in some embodiments may comprise: an identifier indicating that the message comprises a certificate validation, a size of the message, a protocol for the message, a structure of data included in the message.

The certificate validation message may comprise a certificate data 702, which in some embodiments may comprise a digital certificate previously presented on the blockchain for signing. The certificate data 702 may comprise a version number 704, a serial number 706, a signature algorithm 708, a name or identifier of an entity presenting the certificate 710, a public key 712 associated with the certificate or in other embodiments, with the name or identifier of the entity presenting the certificate 710.

The certificate validation message may comprise an associated nonce 714. The associated nonce may comprise an integer or a binary data, loaded onto a device at a prior time. A hash of the nonce may previously have been announced on the blockchain.

The certificate validation message may comprise a calculated hash of the associated nonce 716, said calculation performed using a hash algorithm agreed upon by participants on the blockchain.

The certificate validation message may comprise an announced hash of the associated nonce 718, said announced hash previously published on the blockchain by an apparatus loading the nonce onto a device.

The certificate validation message may comprise a location 720 of the announced hash of the nonce on the blockchain. In some embodiments the location 720 may comprise a sequence number of a block comprising a message, known to those skilled in the art as a block height. In other embodiments the location 720 may comprise one or more of: a time stamp of the block, or a byte offset within a digital representation of the blockchain.

The certificate validation message may comprise an identifier of a hash function 722 used to calculate a hash of the nonce. The hash function may be a cryptographic hash algorithm, for example: SHA, RIPEMD, Whirlpool, Scrypt, HAS-160, or BLAKE, or a combination of some or all of the preceding hash functions.

The certificate validation message may comprise a further location 724 of a validation authority certificate on the blockchain. In some embodiments the further location 724 may comprise one or more of: a time stamp of the block, a byte offset within a digital representation of the blockchain, the block height, or an identifier of a signer of the validation authority certificate. In a further embodiment of this disclosure, the validation authority certificate may comprise one or more of: an authorized digital certificate associated with an apparatus responsible for generating and loading the nonce onto the device, a root certificate that signed the authorized digital certificate, and a further authorized digital certificate.

The certificate validation message may comprise a time stamp 726. In an embodiment the time stamp may comprise a time at which the certificate validation message was constructed. The certificate validation message may also comprise a plurality of time stamps.

The certificate validation message may comprise a message hash 728 of all or part of a preceding certificate validation message contents. The message hash 728 may be calculated using a cryptographic hash algorithm, for example: SHA, RIPEMD, Whirlpool, Scrypt, HAS-160, BLAKE, or other cryptographic hash function applied to all or part of the preceding content of the preceding certificate validation message contents, where a hash output cannot be determined from a hash input other than by an application of the cryptographic hash function to the hash input.

The certificate validation message may also comprise a digital signature 730, generated with a digital signature algorithm using a private key associated with the validation authority certificate and the message hash 728, in order to provide for the veracity of the certificate validation message. The digital signature algorithm used may be one of ECDSA, DSA, RSA, or some other secure asymmetric key digital signing algorithm.

Figure 8:
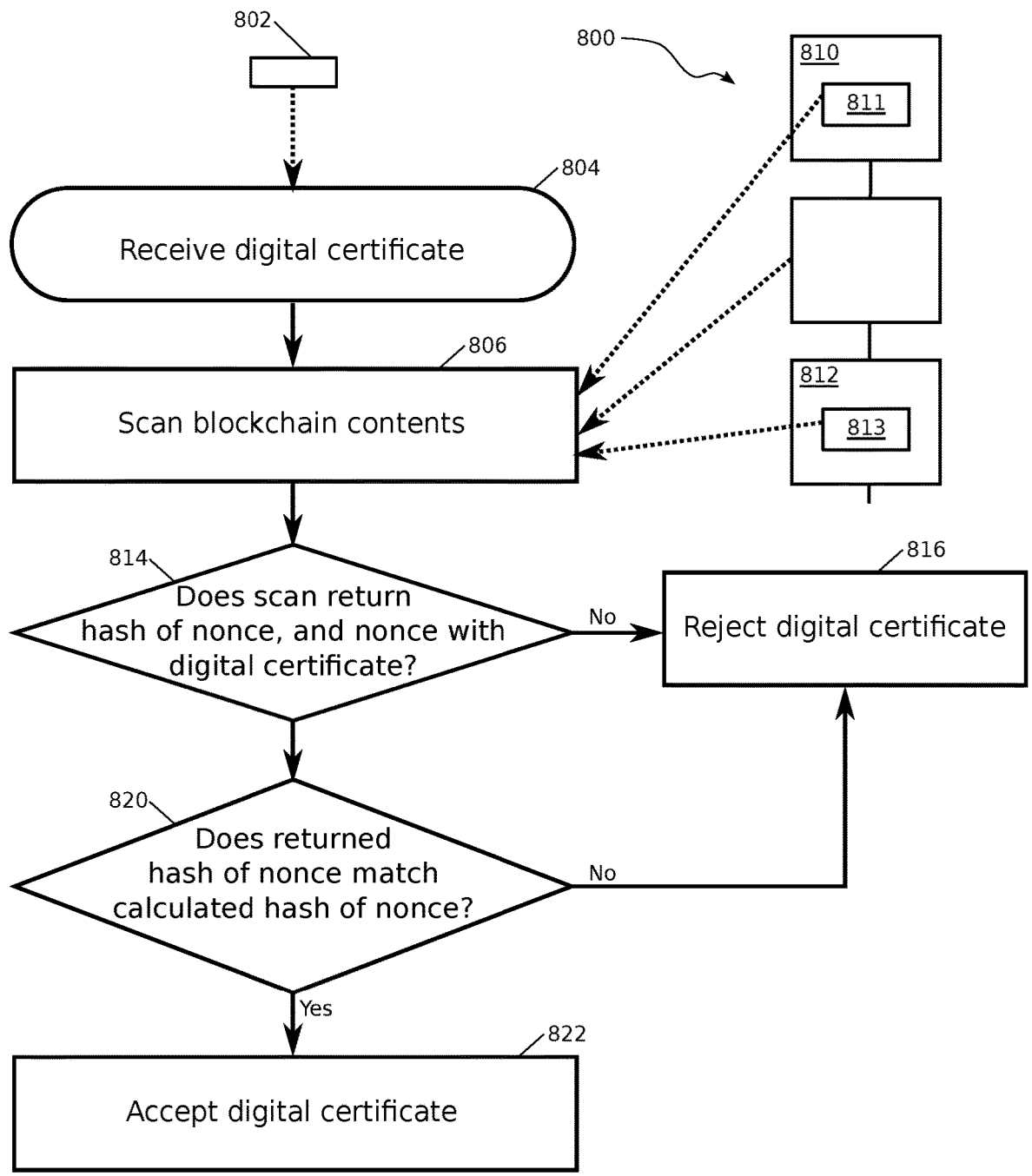
FIG. 8 is a block diagram illustrating a third party verifying a validity of a digital certificate presented by a device.

In FIG. 8 a block diagram illustrating a third party verifying, through a medium of a blockchain 800, a validity of a digital certificate 802 presented by a device is shown.

In an embodiment, operations may commence through a receiving of the digital certificate 802, as shown in step 804. The digital certificate 802 may be received as part of an initiation of a secure communication channel, for example: an SSL connection, a TLS connection, a DTLS connection, or an other form of secure communication channel.

The blockchain 800 may then be scanned for transactions referencing the digital certificate 802, as shown in step 806. In a present example of the embodiment, a transaction 813 comprising the digital certificate 802 and a nonce may be detected in a block 812 of the blockchain 800, and an announcement transaction 811 comprising a hash of the nonce may be detected in a further block 810. In other embodiments different transactions may or may not be detected in different blocks.

In step 814 results of a scan of the blockchain may be examined. If the scan does not return a copy of the digital certificate 802, the nonce, and the hash of the nonce, operations may proceed to step 816, and the digital certificate 802 may be rejected. In some embodiments, the initiation of the secure communication channel may therefore be terminated.

If the scan does return the copy of the digital certificate 802, the nonce, and the hash of the nonce, operations may proceed to step 820.

In step 820 the hash of the nonce may be compared with a calculated hash of the nonce. If the hash of the nonce and the calculated hash of the nonce are not equal, operations may proceed to step 816, and the digital certificate 802 may be rejected. In some embodiments, the initiation of the secure communication channel may therefore be terminated.

If the hash of the nonce and the calculated hash of the nonce are equal, operations may proceed to step 822.

In step 822, the digital certificate may be accepted as valid, and the initiation of the secure communication channel may be successfully completed.

Figure 9:
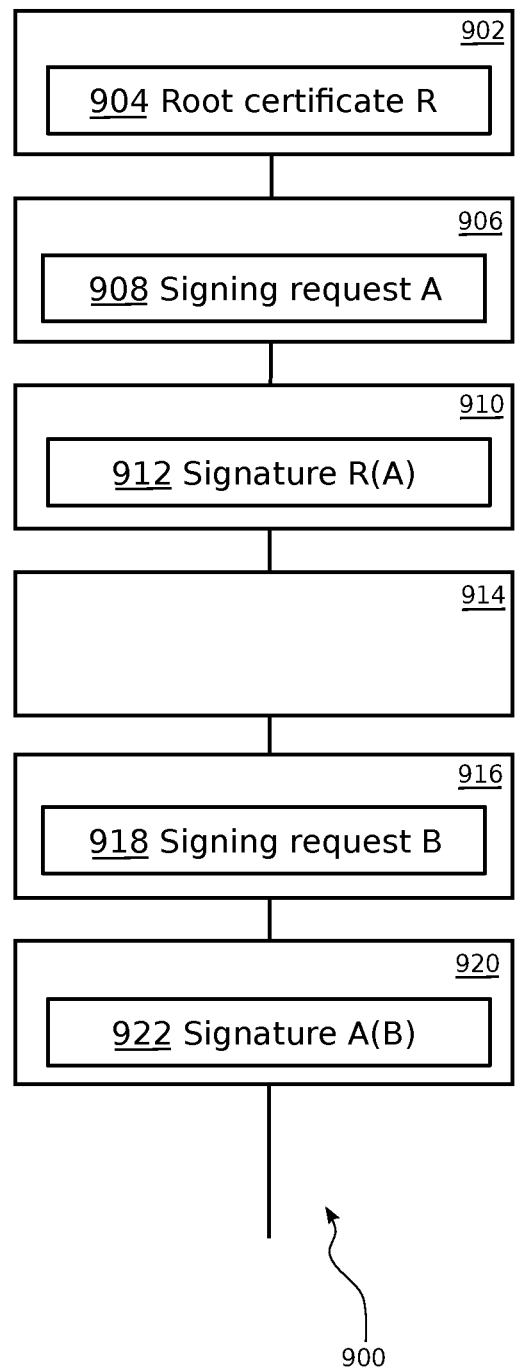
FIG. 9 is an illustration of a chain of digital certificates and authorization signatures on a blockchain.

In FIG. 9 an illustration of a chain of digital certificates and authorization signatures on a blockchain 900 is presented. A validity of a digital certificate may depend on said digital certificate being signed by an authorized certificate. Those skilled in the art will be aware that authority may be chained through a list of signed certificates, leading back to an initial root certificate. Through a blockchain the list may be stored and accessed in a decentralized manner, without need for recourse to a central authority.

In an embodiment, a block 902 may comprise a certificate announcement message 904, said certificate announcement message comprising a root certificate R.

A subsequent block 906 may comprise a signing request 908 for a certificate A. In some embodiments, certificate A may comprise an authorized digital certificate of an apparatus for provisioning a device with a digital certificate.

A further block 910 may comprise a signature message 912, said signature message 912 comprising a signature R(A), wherein certificate A may be signed by the root certificate R, thereby providing certificate A with an authority to sign and validate subsequent digital certificates.

An other block 914 may not comprise a certificate message, signing request, or signature message.

An other further block 916 may comprise a further signing request 918 for a certificate B. In some embodiments, certificate B may comprise a digital certificate for the device. The further signing request 918 may consist of a transaction comprising a nonce provided to the device by the apparatus, and a self-signed digital certificate provided by the device.

An other subsequent block 920 may comprise a further signature message 922, said further signature message 922 comprising a signature A(B), wherein certificate B may be signed by certificate A.

Those skilled in the art will appreciate from the above disclosure that the blockchain 900 comprises a sequence of certificates, signing requests and signatures, whereby a chain of authorization extends from root certificate R to a certificate B. In general, the method may be extended to include a longer chain, a tree, a web, or a tangle of interdependent signed certificates.

In FIG. 10 an exemplary embodiment of a structure of a smart contract 1000 is presented. In the exemplary embodiment the smart contract 1000 may provide blockchain functionality in a form of procedures and methods related to digital certificate provisioning.

In some embodiments the smart contract 1000 may comprise a procedure 1002 for signing a hash of a nonce and publishing the hash on a blockchain.

In some embodiments the smart contract 1000 may comprise a procedure 1004 for publishing a nonce and a digital certificate on the blockchain.

In some embodiments the smart contract 1000 may comprise a procedure 1006 for checking a validity of a digital certificate. Said procedure 1006 may take a digital certificate as an input parameter, scan the blockchain for an associated hash of a nonce, and a transaction comprising a copy of the digital certificate and the nonce, and may subsequently determine the digital certificate to be valid or invalid.

In some embodiments the smart contract 1000 may comprise a function 1008 for generating a signature for a digital certificate and publishing the signature on the blockchain.

In some embodiments the smart contract 1000 may comprise a function 1010 generating a revocation request for a digital certificate and publishing it on the blockchain.

In some embodiments the smart contract 1000 may comprise a function 1012 revoking a certificate when called with appropriate parameters. The appropriate parameters may compromise one or more of: a request to revoke, a certificate identifier, and a digital signature authorizing a revocation.

Figure 11:
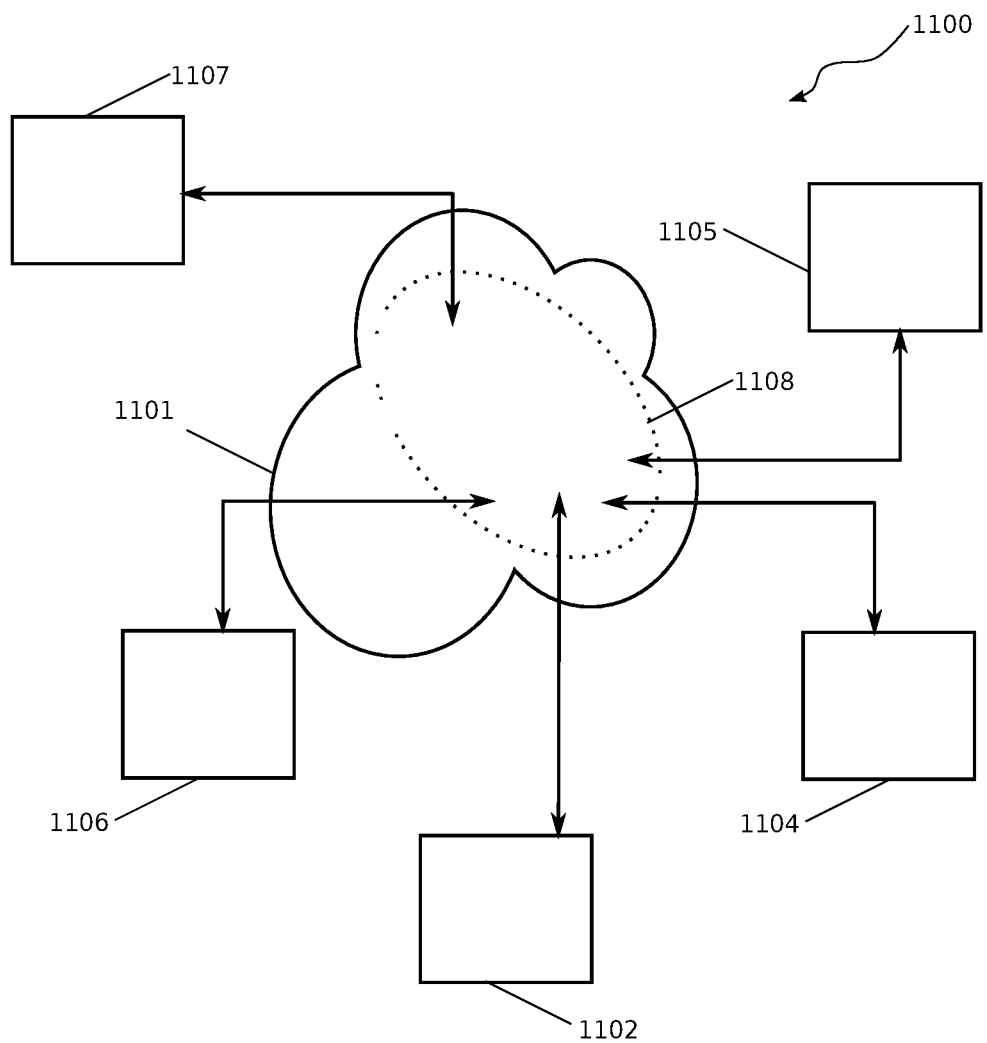
FIG. 11 is an illustration of a peer-to-peer network with a plurality of devices connected to the peer-to-peer network, in accordance with an embodiment of the present invention.

The systems and methods disclosed above may be embodied in a system of a plurality of network connected devices communicating through the medium of a peer-to-peer network system 1100 instantiating and maintaining a blockchain, as shown schematically in FIG. 11.

As depicted, the peer-to-peer network 1108 may be embodied within a packet switched network 1101, through the interconnection of the plurality of network connected devices on the peer-to-peer network 1108.

A device 1102 may connect to the peer-to-peer network 1108 as a digital certificate provisioning apparatus. Said device 1102 may submit a transaction comprising a hash of a nonce to the peer-to-peer network for inclusion on the blockchain, and may load the nonce onto a device 1107.

Other devices connected the peer-to-peer network may include a network connected device acting as a node 1104, whose role is to maintain a list of other devices connected through the peer-to-peer network, and to forward on received network messages to those devices on the list, possibly independently, or possibly as a response to a request from another network connected device. As one skilled in the art will be aware, no individual node is required to have a complete list of all devices, as the process of peer-to-peer networking only requires that a union of a set of all nodes contains a complete list of all devices on the peer-to-peer network, and for every pair of network connected devices there is a network route from one device to the other, possibly via a set of one or more nodes. Therefore, the only requirement to be a participant on the peer-to-peer network is to establish a connection to one or more of the nodes on said network.

Further devices connected via the peer-to-peer network may include one or more network connected devices 1105, 1106 acting as a miner, whose role is to receive or request certificate signing and certificate revocation messages from the peer-to-peer network, process them according to a protocol of the blockchain, and transmit the results of said processing back to the peer-to-peer network for inclusion in the blockchain.

A further device 1107 may connect to the peer-to-peer network as a client, and may submit a transaction comprising a digital certificate and the nonce, or other transactions as disclosed above.

The technology described herein is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, processor-based systems, programmable consumer electronics, network PCs, minicomputers, mainframe computers, distributed computing environments that include any of the above systems or devices, and the like.

As used herein, instructions refer to computer-implemented steps for processing information in the system. Instructions can be implemented in software, firmware or hardware and include any type of programmed step undertaken by components of the system.

A processor may be any conventional general purpose single- or multi-chip processor such as a Pentium® processor, a Pentium® Pro processor, a 8051 processor, a MIPS® processor, a Power PC® processor, or an Alpha® processor. In addition, the processor may be any conventional special purpose processor such as a digital signal processor or a graphics processor. The processor typically has conventional address lines, conventional data lines, and one or more conventional control lines.

The system is comprised of various modules as discussed in detail. As can be appreciated by one of ordinary skill in the art, each of the modules comprises various sub-routines, procedures, definitional statements and macros. Each of the modules are typically separately compiled and linked into a single executable program. Therefore, the description of each of the modules is used for convenience to describe the functionality of the preferred system. Thus, the processes that are undergone by each of the modules may be arbitrarily redistributed to one of the other modules, combined together in a single module, or made available in, for example, a shareable dynamic-link library.

The system may be used in connection with various operating systems such as Linux®, UNIX® or Microsoft Windows®.

The system may be written in any conventional programming language such as C, C++, Pascal, or Java, and ran under a conventional operating system. C, C++, Pascal, Java, and FORTRAN are industry standard programming languages for which many commercial compilers can be used to create executable code. The system may also be written using interpreted languages such as Perl, Python or Ruby, or languages that may either be compiled or interpreted, such as BASIC or Lisp.

Those of skill will further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the embodiments disclosed herein may be implemented or performed with a general purpose processor, a DSP, an ASIC, an FPGA or other programmable logic device, discrete gate or transistor logic, discrete hardware components, or any combination thereof designed to perform the functions described herein. A general purpose processor may be a microprocessor, but in the alternative, the processor may be any conventional processor, controller, micro-controller, or state machine. A processor may also be implemented as a combination of computing devices, e.g., a combination of a DSP and a microprocessor, a plurality of microprocessors, one or more microprocessors in conjunction with a DSP core, or any other such configuration.

In one or more example embodiments, the functions and methods described may be implemented in hardware, software, or firmware executed on a processor, or any combination thereof. If implemented in software, the functions may be stored on or transmitted over as one or more instructions or code on a computer-readable medium. Computer-readable media include both computer storage media and communication media including any medium that facilitates transfer of a computer program from one place to another. A storage medium may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

The foregoing description details certain embodiments of the systems, devices, and methods disclosed herein. It will be appreciated, however, that no matter how detailed the foregoing appears in text, the systems, devices, and methods can be practiced in many ways. As is also stated above, it should be noted that the use of particular terminology when describing certain features or aspects of the disclosure should not be taken to imply that the terminology is being re-defined herein to be restricted to including any specific characteristics of the features or aspects of the technology with which that terminology is associated.

It will be appreciated by those skilled in the art that various modifications and changes may be made without departing from the scope of the described technology. Such modifications and changes are intended to fall within the scope of the embodiments. It will also be appreciated by those of skill in the art that parts included in one embodiment are interchangeable with other embodiments; one or more parts from a depicted embodiment can be included with other depicted embodiments in any combination. For example, any of the various components described herein and/or depicted in the Figures may be combined, interchanged or excluded from other embodiments.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

While various aspects and embodiments have been disclosed herein, other aspects and embodiments will be apparent to those skilled in the art. The various aspects and embodiments disclosed herein are for purposes of illustration and are not intended to be limiting.

As will be appreciated from the above discussion, an advantage of the systems and methods of this disclosure includes provisioning a device with a digital certificate without recourse to a central authority, through the medium of a blockchain.

What is claimed is:

1. A method for provisioning a device with a digital certificate comprising:
    loading a nonce onto the device;
    publishing a hash of the nonce on a blockchain, signed by an authorized digital certificate;
    in response to loading the nonce onto the device and publishing the hash of the nonce on the blockchain, publishing a message comprising the digital certificate and the nonce on the blockchain via an intermediary; and
    rejecting a validity of the digital certificate if the blockchain does not comprise the message.

2. The method of claim 1, further comprising loading a plurality of nonces onto the device, and publishing a plurality of hashes of the plurality of nonces signed by one or more authorized digital certificates on the blockchain.

3. The method of claim 1, wherein the device is an Internet of Things (IoT) compatible device and the intermediary is one or more of: a blockchain node, a CoAP server, an MQTT server, and/or a proxy server.

4. The method of claim 1, wherein the digital certificate comprises a public key and one or more of: a subject, an email address, a serial number, a thumb-print record or other biometric record, an expiry date, a signature by a second authorized digital certificate, a signature by a root certificate, a usage descriptor, a common name, a web site identifier, a device identifier, an organization name, an organizational unit, an issue date, and/or a hash or some or all of the digital certificate.

5. The method of claim 1, further comprising publishing a second message on the blockchain, comprising a signature of the digital certificate generated using the authorized digital certificate.

6. The method of claim 1, wherein one or more of: the digital certificate, the hash of the nonce, the message, the authorized digital certificate, and the signature are stored in a smart contract on the blockchain.

7. An apparatus for provisioning a device with a digital certificate, wherein the apparatus comprises a processor configured to:
    load a nonce onto the device;
    publish a hash of the nonce on a blockchain, signed by an authorized digital certificate and;
    reject a validity of the digital certificate if the blockchain does not comprise a message comprising the digital certificate and the nonce;
and wherein the device is configured, in response to the processor loading the nonce onto the device and publishing the hash of the nonce on the blockchain, to:
    publish the message on the blockchain via an intermediary, said intermediary comprising one or more of: a blockchain node, a CoAP server, an MQTT server, and/or a proxy server.

8. The apparatus of claim 7, wherein the processor is further configured to:
    load a plurality of nonces onto the device; and
    publish a plurality of hashes of the plurality of nonces, signed by one or more authorized digital certificates, on the blockchain.

9. The apparatus of claim 7, wherein the device is an Internet of Things (IoT) compatible device.

10. The apparatus of claim 7, wherein the digital certificate comprises a public key and one or more of: a subject, an email address, a serial number, a thumb-print record or other biometric record, an expiry date, a signature by a second authorized digital certificate, a signature by a root certificate, a usage descriptor, a common name, a web site identifier, a device identifier, an organization name, an organizational unit, an issue date, and/or a hash or some or all of the digital certificate.

11. The apparatus of claim 7, wherein the processor is further configured to publish a second message on the blockchain, comprising a signature of the digital certificate generated using the authorized digital certificate.

12. The apparatus of claim 7, wherein one or more of: the digital certificate, the hash of the nonce, the message, the authorized digital certificate, and the signature are stored in a smart contract on the blockchain.

13. A non-transitory computer readable medium embodying instructions for provisioning a device with a digital certificate, the instructions when executed causing a processor to perform:
    loading a nonce onto the device;

publishing a hash of the nonce on a blockchain, signed by an authorized digital certificate;

rejecting a validity of the digital certificate if the blockchain does not comprise a message comprising the digital certificate and the nonce;

and wherein the device is configured, in response to the processor loading the nonce onto the device and publishing the hash of the nonce on the blockchain, to:

publish the message on the blockchain via an intermediary, said intermediary comprising one or more of: a blockchain node, a CoAP server, an MQTT server, and/or a proxy server.

14. The non-transitory computer readable medium of claim 13, wherein the processor further performs:

loading a plurality of nonces onto the device; and publishing a plurality of hashes of the plurality of nonces, signed by a one or more authorized digital certificates, on the blockchain.

15. The non-transitory computer readable medium of claim 13, wherein the device is an Internet of Things (IoT) compatible device.

16. The non-transitory computer readable medium of claim 13, wherein the digital certificate comprises a public key and one or more of: a subject, an email address, a serial number, a thumb-print record or other biometric record, an expiry date, a signature by a second authorized digital certificate, a signature by a root certificate, a usage descriptor, a common name, a web site identifier, a device identifier, an organization name, an organizational unit, an issue date, and/or a hash or some or all of the digital certificate.

17. The non-transitory computer readable medium of claim 13, wherein the processor further performs publishing a second message on the blockchain, comprising a signature of the digital certificate generated using the authorized digital certificate.

18. The non-transitory computer readable medium of claim 13, wherein one or more of: the digital certificate, the hash of the nonce, the message, the authorized digital certificate, and the signature are stored in a smart contract on the blockchain.

* * * * *